(12) United States Patent
Beyer et al.

(10) Patent No.: US 7,976,611 B2
(45) Date of Patent: Jul. 12, 2011

(54) CONTINUOUS PROCESS AND APPARATUS FOR RECOVERING METAL FROM METAL AND ORGANIC WASTE, BY COMBUSTION OF ORGANIC CONSTITUENT OF WASTE IN ROTARY TUBE FURNACE

(75) Inventors: Joachim Beyer, Kürten (DE); Walter Leidinger, Düsseldorf (DE); Wolfgang Calaminus, Krefeld (DE); Egidius Vickus, Leverkusen (DE); Wilhelm Kuckelsberg, Leverkusen (DE); Mark Mätschke, Kürten (DE)

(73) Assignee: Currenta GmbH & Co. OHG, Leverkusen (DE)

( * ) Notice: Subject to any disclaimer, the term of this patent is extended or adjusted under 35 U.S.C. 154(b) by 669 days.

(21) Appl. No.: 11/913,187

(22) PCT Filed: Apr. 25, 2006

(86) PCT No.: PCT/EP2006/003770
§ 371 (c)(1),
(2), (4) Date: Oct. 31, 2007

(87) PCT Pub. No.: WO2006/119861
PCT Pub. Date: Nov. 16, 2006

(65) Prior Publication Data
US 2009/0129996 A1    May 21, 2009

(30) Foreign Application Priority Data
May 6, 2005   (DE) .................. 10 2005 021 656

(51) Int. Cl.
*C22B 4/00* (2006.01)
(52) U.S. Cl. ............... 75/401; 75/403; 75/414; 75/419; 588/320; 588/405

(58) Field of Classification Search .............. 75/401, 75/414, 419, 426–432, 403; 588/320, 321, 588/405, 410
See application file for complete search history.

(56) References Cited

U.S. PATENT DOCUMENTS

| | | | |
|---|---|---|---|
| 3,817,697 A | 6/1974 | Parobek | |
| 4,415,360 A | 11/1983 | Leirnes et al. | |
| 5,013,533 A | 5/1991 | Howard et al. | |
| 5,451,033 A * | 9/1995 | Perry et al. | 266/145 |
| 2005/0077658 A1 | 4/2005 | Zdolshek et al. | |

FOREIGN PATENT DOCUMENTS

| | | |
|---|---|---|
| DE | 35 18 725 | 11/1986 |
| DE | 36 12 892 A1 | 10/1987 |
| DE | 93 20 018 U1 | 4/1994 |
| DE | 94 20 410 U1 | 2/1995 |
| EP | 0 523 858 A | 1/1993 |
| WO | 2005 084839 A | 9/2005 |

OTHER PUBLICATIONS

E. Pankratz, "Enviromental Protection during the Recovery of Ni-Catalysts", Fat. Sci. Technol., vol. 97, p. 508-512, (1995).
Von E. Pankratz, "Recovery of Spent Fatty Nickel-Catalysts" Fat. Sci. Technol., vol. 95, p. 487-490, (1993).

* cited by examiner

Primary Examiner — Steven Bos
(74) Attorney, Agent, or Firm — Norris McClaughlin & Marcus PA

(57) ABSTRACT

Process for recovering metals from metal-containing wastes and materials, characterized in that the metal-containing waste is preferably introduced continuously into a process chamber, treated thermally with continuous intensive mixing, the organic components are continuously removed and subsequently oxidized and the metal-containing components, preferably as metal conglomerates, and the further inorganic metal-free components are discharged essentially continuously from the process chamber and a plant for carrying out the process.

13 Claims, 3 Drawing Sheets

Figure 1:
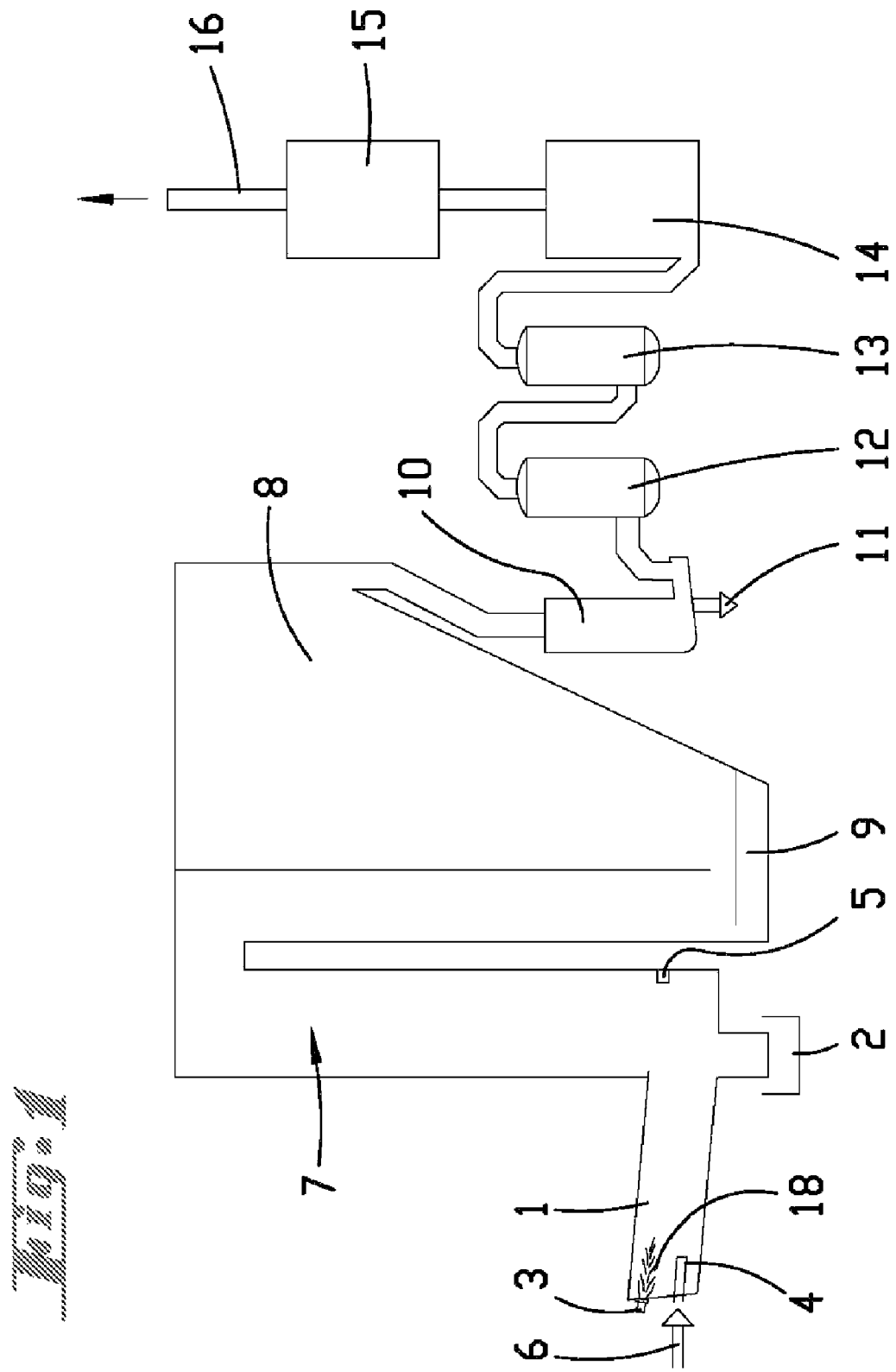

CONTINUOUS PROCESS AND APPARATUS FOR RECOVERING METAL FROM METAL AND ORGANIC WASTE, BY COMBUSTION OF ORGANIC CONSTITUENT OF WASTE IN ROTARY TUBE FURNACE

This is a 371 of PCT/EP2006/003770 filed 25 Apr. 2006 (international filing date).

The invention relates to a process for recovering metals, in particular noble metals, from wastes and/or materials, in which the organic components are removed from the wastes and/or materials and oxidized in a preferably continuous process by thermal treatment in a process chamber, and also a plant for carrying out the process.

BACKGROUND OF THE INVENTION

The prior art discloses processes for the mechanical separation of components, in which a maximum of up to 90% of the metals of value present can be recovered. In addition to the mechanical separation, disposal of the pollutant-containing organic constituents which remain is necessary.

DE A 9420410, DE A 9320018 and DE A 3518725 C2 disclose a process for the thermal treatment of electronics scrap by pyrolysis. In this process, the pyrolysis carbon remaining in the residue is removed in a further work-up. High concentrations of dioxins and furans sometimes have to be reckoned with in this pyrolysis carbon. DE A 9420410, DE A 9320018 and DE A 3518725 C2 are concerned with a process for the thermal recycling of metallic articles which are mixed or coated with organic substances or are similarly contaminated, for example paint or oil cans or canisters, drums or other containers. These starting components, referred to as scrap, are introduced into a carbonization chamber in which they are firstly treated thermally essentially without introduction of oxygen. This carbonization chamber is operated during the carbonization phase with external heating and at a temperature in the range from about. 250 to 500° C. and has a rotating drum which is operated at a speed of rotation of from 1 to 2 revolutions per minute during the process. Combustible pyrolysis gases or combustible pyrolysis oils are formed during the carbonization phase and these can be used to bring the carbonization chamber to temperature. The carbonization process is followed by an oxidation process in which the pyrolysis gases produced during the carbonization process are burnt in the same chamber but at a later time by introduction of oxygen. This burning of the pyrolysis gases can also be carried out in an after-combustion chamber located downstream of the carbonization chamber. This text also addresses the recycling of sweepings comprising noble metal dust as can arise, inter alia, in the jewelry industry.

The carbonization/oxidation process is described in detail in a publication W L B Wasser, Luft und Boden 3/2000, on page 46 "Edelmetall-Recycling: Verschwelung statt Verbrennung".

All these processes have the disadvantage that more than 10% of the metal from the scrap cannot be reused and they involve sequential steps.

It is therefore an object of the invention to provide a simple process by means of which a secondary raw material is obtained in high yields (>90%) from metal-containing starting materials, in particular electronics scrap.

SUMMARY OF THE INVENTION

The invention provides a process for recovering metals from metal-containing wastes and materials, characterized in that the metal-containing waste is preferably introduced continuously into a process chamber, treated thermally with continuous intensive mixing, the organic components are continuously removed and subsequently oxidized and the metal-containing components, preferably as metal conglomerates, and the further inorganic metal-free components are discharged essentially continuously from the process chamber.

For the purposes of the invention, metal-containing waste and materials are usually mixtures of metals including noble metals and organic or inorganic substances. The process is, for example, suitable for electronics scrap and serves, in particular, as pretreatment for the recovery of metals such as copper, zinc, tin, lead and in particular pretreatment for the recovery of noble metals such as gold, silver, platinum and palladium. Examples of material to be treated are boards or parts of appliances or complete electronic appliances provided with electronic components. Organic constituents are, for example, plastics, including material which is relatively nonflammable and/or contains bromine, chlorine or other halogens, possibly admixed with nonmetallic constituents such as glass fibers. These wastes are preferably fed into the process chamber in precomminuted form.

Preferably the metal-containing waste is electronics scrap which is comminuted or uncomminuted and comprises boards and/or plastic housings or plastic housing parts and/or iron parts. In addition, comminuted iron parts, fluxes and/or solders may be added to the waste.

Unlike the prior art mentioned at the outset, the process does not occur in successive process steps which may be separated by pauses in batch operation in a process chamber which has to be charged before the process and emptied again after the process but in a continuous process. The metal-containing waste is continuously fed to the process and intensively mixed in the process chamber.

For the purposes of the invention, intensive mixing means that the waste is continually kept in motion by means of a rotary tube, a grating furnace or in a fluidized-bed process or is introduced in finely divided form into the process chamber.

Thermal treatment means, for the purposes of the invention, that temperatures of from 400 to 1100° C., preferably from 600 to 900° C., in a further preferred embodiment from 500 to 900° C., particularly preferably from 700 to 850° C. (FIG. 2b, phase B), are maintained in the process chamber.

To aid the process, gases such as oxygen-containing gases can be introduced deliberately into the process chamber.

DETAILED DESCRIPTION

Figure 2:
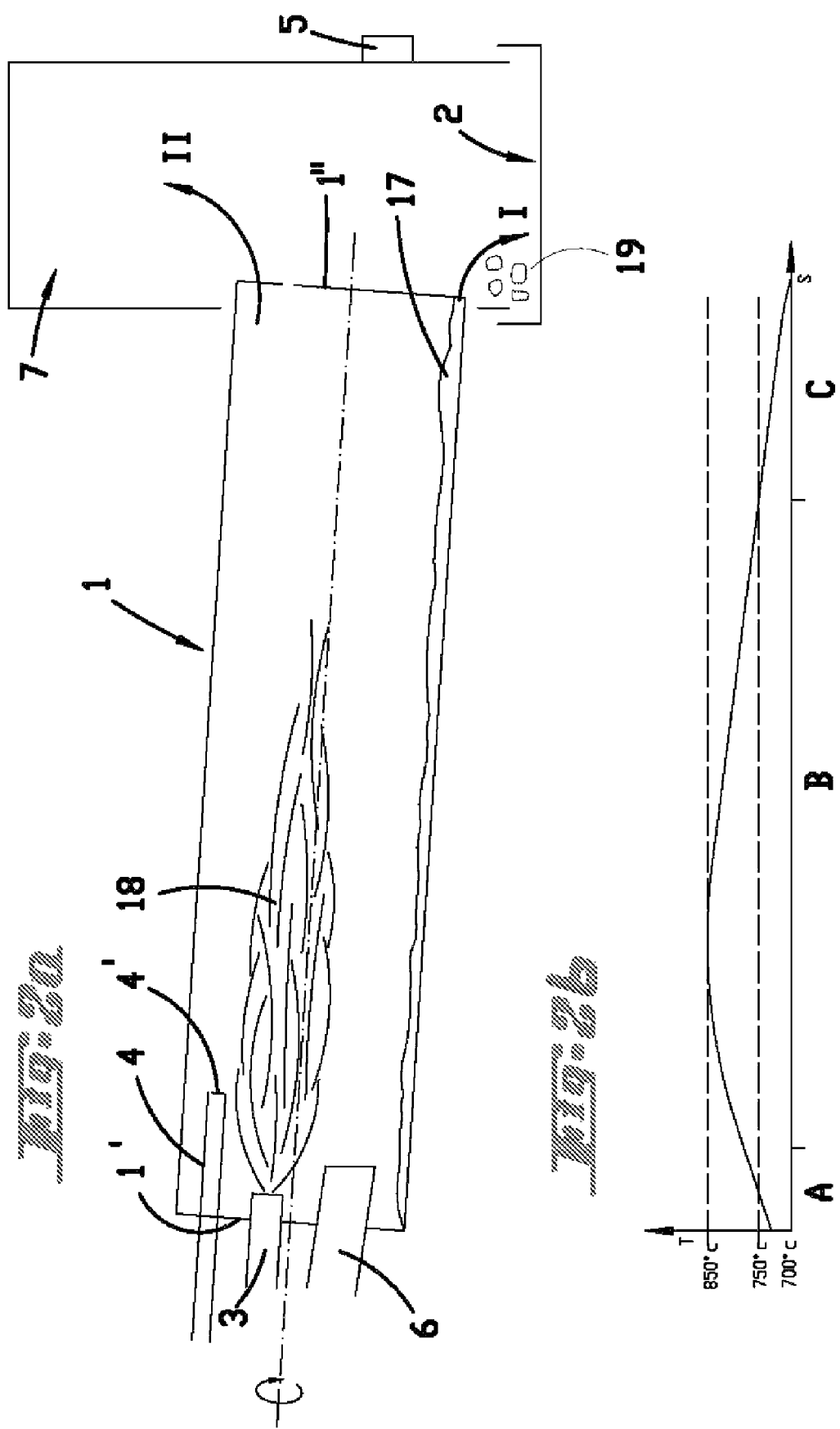

The process chamber is preferably formed by a rotary tube furnace which consists essentially of an elongated rotary tube which at one end forms a feed opening. As a result of the rotation of the rotary tube and its inclination, the scrap introduced into the rotary tube at the feed end is intensively mixed and transported along on the bottom of the tube. The material located in the process chamber, in particular in the rotary tube, is treated thermally in a predetermined temperature range in a combustion zone B following the heating zone A (FIG. 2b). An auxiliary firing can also be provided at the feed end in order to initiate or aid the thermal processes.

The heating of the scrap to from 700 to 850° C. is preferably initiated by an auxiliary firing (3) which is located at the feed end (1') of the rotary tube furnace (1).

The process temperature is kept in a suitable range by means of suitable temperature measurement means (e.g. thermocouple, infrared camera), temperature regulating means (e.g. electronic image analysis of infrared camera data) and temperature control means (e.g. introduction of coolants into the process chamber).

The infrared camera (5) is preferably located at the outlet end (1") and in particular on a wall of an after-combustion chamber (7) located at a distance from the end of the rotary tube.

At such temperatures, the organic components are given off into the combustion zone; the nonvolatile combustion product remains on the bottom of the process chamber or the rotary tube and is conveyed to the outlet end where it leaves as a residue which comprises essentially only metal constituents and inorganic nonmetal constituents which are passed to subsequent processing (e.g. smelting).

In a preferred embodiment, the metal-containing waste is transported from the feed end (1') to the outlet end (1"), with the waste firstly being heated in a heating zone (A), if appropriate with the aid of an auxiliary firing (3), the organic components then being thermally separated from the metallic components and at least partly, preferably mostly, burnt in a subsequent combustion zone (B) and the nonvolatile metal constituents together with any nonvolatile inorganic constituents present finally being discharged essentially continuously at the outlet end located opposite the feed end of the process chamber.

The organic components which have been separated off thermally are transported away as flue gas (II), with a not inconsiderable amount of the organic constituents being oxidized within the combustion zone. These combustion products are also present in the flue gas (II). In addition, metal vapors and metal compounds which may be formed in the process chamber can also be present in the flue gas (II). The process conditions within the process chamber are preferably selected (see above) so that the proportion of the metal which goes as gas or as particles into the flue gas purification is, in the case of the metals to be recycled, less than 7%, preferably less than 3%, particularly preferably less than 1%. Metals such as Al, Mg, Sb, As which can interfere in a subsequent work-up process can be at least partly removed via the flue gas (II).

In a preferred embodiment, the residence time of the flue gas in the hot zone of the after-combustion chamber is from 2 to 7 seconds. The fully burnt flue gases deposit dusts on flowing through the downstream steam boiler (8). These are collected in a dust chamber (9).

The components of the gas stream leaving the process chamber comprise, in particular, flue gases from the combustion which has occurred, incompletely oxidized organic compounds, metal vapors, metal compounds, dusts and other inorganic compounds. These are fed into an after-combustion chamber which is located downstream of the process chamber and in which complete oxidation of all residual organic compounds still present occurs. The residence time of the flue gas (II) in the after-combustion chamber of preferably greater than 2 seconds is sufficiently long for this purpose. The temperature within the after-combustion chamber is sufficiently high and is, in particular, above 850° C., preferably above 1000° C., in a further embodiment in particular above 800° C., preferably above 900° C. At such temperatures, dioxins and furans are destroyed completely. The flue gas (II) laden with inorganic pollutants is subsequently purified in a number of stages to adhere to low emission values. Before this, heat energy can be withdrawn from the flue gas (II) by cooling and be utilized elsewhere in a suitable form. The subsequent flue gas purification is preferably carried out as follows: the flue gas (II) is, in the first step, cooled in a quench (10) to a temperature below 100° C., preferably to from about 70 to 80° C., preferably by spraying in water. The quench is followed by scrubbers to remove further constituents from the flue gas (II). These are rotary scrubbers which can be operated under acidic and/or alkaline conditions. The fine dust is subsequently removed in a condensation electrofilter (14). In the final step, the concentration of any dioxins and furans and also nitrogen oxides present in the flue gas is significantly reduced over a catalyst. The residual amounts of metals of value present in the wastewater from the flue gas purification can be passed to further use via a downstream wastewater treatment plant.

The purified exhaust air is preferably discharged via a chimney (16).

As catalysts, it is possible to use all substances known to those skilled in the art for catalytic after-purification.

The process is preferably carried out so that melting of individual low-melting metallic components occurs during the thermal treatment and these in turn dissolve high-melting metals. This metal solution also takes up, in particular, noble metal constituents. These metallic components appear in the form of metal conglomerates in the residue which is discharged. The metal conglomerates can be separated off. The formation of these metal conglomerates can be increased by means of an appropriate concentration of iron and/or solder (e.g. tin, lead, bismuth). Iron, solder and/or fluxes can also be added for this purpose.

The advantage of the invention is that the metal conglomerates can be separated off from the solid inorganic constituents in a simple fashion and can, in a downstream work-up process (e.g. smelting), be introduced directly into a very late substep of the smelting process. This can increase the efficiency of metal recovery in the downstream work-up process.

The invention further provides a plant for the thermal treatment of metal-containing wastes and materials, which comprises a rotary tube furnace (1), a continuously operating feed device (6), at least one after-combustion chamber, at least one waste heat boiler, at least one quench, a rotary scrubber or at least two rotary scrubbers connected in series, at least one condensation electrofilter and at least one catalytic after-purification for the flue gases.

The rotary tube furnace (1) comprises an elongated tube which, for industrial applications, preferably has a length of from 10 to 13 m, with other appropriate lengths also being possible. This tube is preferably inclined to the horizontal and lined with bricks of a refractory material.

In order to provide cooling, preference is given to installing a coolant addition lance (4) which projects from the feed end (1') into the rotary tube furnace (1) and from whose nozzle (4') water or a coolant is introduced into the furnace.

In a further embodiment, the temperature in the rotary tube furnace (1) is monitored by means of a thermocouple and an infrared camera (5).

In the combustion zone (B), the organic constituents are preferably removed from the scrap and the combustion products are conveyed together with any metal vapors, metal compounds and dusts formed as flue gas (II) to the after-combustion chamber (7).

A controlled introduction of oxygen to maintain combustion is likewise preferred.

EXAMPLE

An example of the invention is described below with the aid of accompanying figures, without the invention being restricted to this embodiment.

Figure 3:
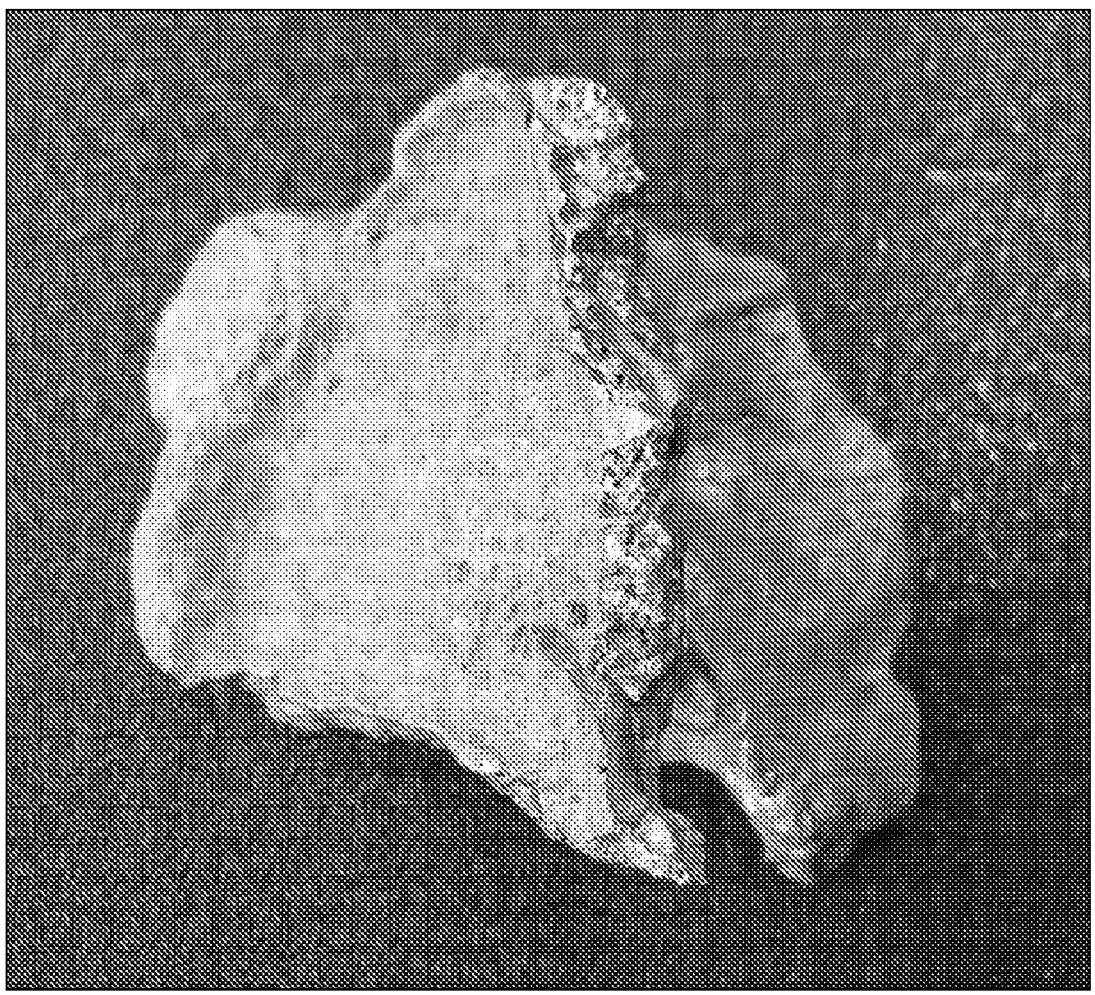

The following reference numerals are used here:
1 rotary tube furnace
1' feed end
1" outlet end
2 water bath
3 auxiliary firing
4 coolant addition lance
4' nozzle
5 thermocouple with infrared camera
6 feed device
7 after-combustion chamber
8 steam boiler
9 dust chamber
10 quench
11 outlet for water-soluble substances and dusts
12 acidic rotary scrubber
13 alkaline rotary scrubber
14 condensation electrofilter
15 catalytic after-purification chamber
16 chimney
17 metal-containing waste
18 flame
19 conglomerates
I solid residue
II flue gas
A heating phase
B combustion zone
C formation of metal conglomerates Brief Description Of The Drawings In the figures:
FIG. 1 schematically shows the construction of an apparatus for carrying out the process;
FIG. 2a shows an enlarged depiction of the process chamber formed by a rotary tube and
FIG. 2b schematically shows the temperature profile along the rotary tube as shown in FIG. 2a.
FIG. 3 shows a photograph of a resulting (metal) conglomerate.

The apparatus for carrying out the process consists essentially of a rotary tube furnace (1) which comprises an elongated tube having a length of from about 10 to 13 m. This tube is inclined to the horizontal and lined with bricks of refractory material. The inclination and the rotation of the tube at from 10 to 20 revolutions per hour [rph] around its longitudinal axis result in the metal-containing waste introduced continuously into the rotary tube at the feed end 1' via a feed device (6) moving through the tube to the outlet end (1") opposite the feed end (1'). The metal-containing waste (17) to be treated is continually kept in motion and intensively mixed in the rotary tube (1).

At the feed end (1'), the rotary tube is supplied with the electronics scrap to be treated. This passes through the rotary tube in a time of about 1.5 hours. Larger pieces of electronics scrap, e.g. chassis, which comprise metal, in particular iron, and plastics, can be comminuted and in particular shredded.

Due to the rotation of the rotary tube, this scrap firstly travels through the heating phase denoted by A within the rotary tube furnace (1). The heat required for heating the scrap is introduced into the rotary tube furnace with the aid of an auxiliary firing (3) which is located at the feed end (1') of the rotary tube furnace (1), for example by means of the elongated flame denoted by the reference numeral (18). Depending on the joule value of the scrap, cooling can be necessary to keep the combustion temperature in the particularly preferred range from 700 to 850° C. This temperature range should be maintained in the combustion zone denoted by B. To effect any cooling necessary, a coolant addition lance (4) which in the example projects from the feed end (1') into the rotary tube furnace (1) and from whose nozzle (4') water or a similar suitable coolant is introduced into the furnace is provided.

The metal-containing waste (17) which is to be treated and moved along the bottom of the rotary tube from the feed end (1') to the outlet end (1") is thus kept in the desired temperature range in which very complete oxidation of the organic constituents of the metal-containing waste is achieved. At the same time, the temperature should not become too high in order to prevent appreciable amounts of the metallic components to be recovered from being transported away via the flue gas (II). Metals such as Al, Mg, Sb, As which can interfere in a downstream work-up process are at least partly removed via the flue gas (II).

The temperature within the rotary tube furnace (1) is monitored by means of a thermocouple and an infrared camera (5) in the example. The camera is located at a distance outside the rotary tube furnace backward from the outlet end on a wall of a downstream after-combustion chamber (7).

In the combustion zone (B), the organic constituents are removed from the scrap. This is achieved by the organic constituents being vaporized or decomposed at the temperatures prevailing there, being converted into gaseous intermediates and being burnt. These combustion products are conveyed together with any metal vapors, metal compounds and dusts formed as flue gas (II) to the after-combustion chamber (7).

A controlled addition of oxygen in the form of air can preferably be provided in order to maintain combustion. This is permitted to the extent that the temperature of the metal-containing waste (17) present in the rotary tube remains in the range from 750° C. to 850° C.

The flue gas (II) fed into the after-combustion chamber (7) is firstly treated thermally at temperatures above 1000° C., so that the organic components present therein are oxidized completely. The residence time of the flue gas in the hot zone of the after-combustion chamber is sufficiently long and is in the range from 2 to 7 seconds. The fully burnt flue gases precipitate dusts on flowing through the downstream steam boiler (8). In the example, these are collected in a dust chamber (9).

To utilize the heat energy, the flue gas (II) which has been treated in this way is fed to a steam boiler (8) in which it is cooled down to temperatures of from 300° C. to 350° C. The steam boiler (8) is operated using water under an appropriate gauge pressure.

The cooled flue gases are subsequently passed to a wet flue gas purification where they are firstly cooled to from 70 to 80° C. by spraying in water in a quench (10). Here, water-soluble substances and dusts are scrubbed out and discharged at the point denoted by the reference numeral (11) in FIG. 1.

The flue gas (II) is subsequently fed firstly into a rotary scrubber (12) operated under acidic conditions in which an acidic scrubbing liquid is fed onto rotary disks which produce a fine mist of liquid. On flowing through this mist, the flue gas (II) comes into intimate contact with the scrubbing liquid, so that further acidic flue gas constituents and also fine dusts are scrubbed out and precipitated.

The rotary scrubber (13) operated under alkaline conditions which is located downstream of the rotary scrubber (12) operated under acidic conditions acts in a similar way. In this stage, an alkaline scrubbing liquid, in the example admixed with sodium hydroxide solution, is introduced in order to remove residual acidic constituents of the flue gas.

The small amount of solid or liquid suspended materials still present in the flue gas (II) is precipitated in an electrostatically operated condensation filter (14). The flue gas (II) which has been treated in this way is subsequently passed to a catalytic after-purification (15) and then released as purified exhaust air via the chimney (16).

Process-Relevant Parameters of the Example

| | | |
|---|---|---|
| 1. | 50 kg/h | auxiliary fuel in the rotary tube |
| 2. | 135 t | metal-containing waste (dry) |
| 3. | 700° C.-850° C. | flue gas temperature at the outlet from the rotary tube |
| 4. | 10-20 rph | speed of rotation |
| 5. | 79 t | fully burnt metal-containing residue (dry) (losses of metals to be recovered about 1% compared to 10% in the prior art) |
| 6. | 640 kg | dust |
| 7. | 1050° C. | flue gas temperature at the outlet of the after-combustion chamber |
| 8. | 30 000 standard m³/h | amount of flue gas |

The metal conglomerates obtained are shown in FIG. 3.

The invention claimed is:

1. A process for recovering metals from wastes and materials containing both metal and organic components, which comprises introducing said wastes and materials continuously, into a rotary tube furnace, thermally treating said wastes and materials with continuous intensive mixing, continuously removing and subsequently oxidizing the organic components and discharging, essentially continuously, the metal components, optionally- as metal conglomerates, and any inorganic metal-free components that may be present from the rotary tube furnace wherein the temperature in the rotary tube furnace is kept in the range of from 400 to 1100° C. by a temperature control means, said temperature control means comprising a coolant addition lance which projects from the feed end into the rotary tube furnace and from whose nozzle water or a coolant is introduced into the rotary tube furnace.

2. The process as claimed in claim 1, further comprising the controlled addition of air into the rotary tube furnace.

3. The process as claimed in claim 1, wherein the rotary tube furnace is an inclined rotary tube furnace.

4. The process as claimed in claim 3, wherein said rotary tube furnace has a feed end and an outlet end, and the metal-containing waste is transported from the feed end to the outlet end, with the waste firstly being heated in a heating zone, optionally with auxiliary firing, the organic components then being thermally separated from the metallic components and at least partly, burnt in a subsequent combustion zone, the combustion products being conveyed out of the rotary tube furnace as a flue gas, and the nonvolatile metal constituents together with any nonvolatile inorganic constituents present finally being discharged essentially continuously at the outlet end located opposite the feed end of the rotary tube furnace.

5. The process as claimed in claim 4, wherein the flue gas leaving the rotary tube furnace process chamber, comprising oxidized organic compounds, metal vapors, metal compounds, dusts and other inorganic compounds, is fed into an after-combustion chamber which is located downstream of the rotary tube furnace and in which complete oxidation of all residual organic compounds still present in the flue gas occurs and the residence time of the flue gas is greater than 2 seconds and the temperature within the after-combustion chamber is above 850° C.

6. The process as claimed in claim 1, wherein the flue gas laden with inorganic pollutants is purified in a number of stages to achieve low emission values.

7. The process as claimed in claim 1, wherein the metal-containing waste is electronics scrap which is comminuted or uncomminuted and comprises boards and/or plastic housings or plastic housing parts and/or iron parts.

8. The process as claimed in claim 4, wherein the combustion temperature in the rotary tube furnace is kept in a range in which, firstly, the burn-out of the waste is essentially complete and, secondly, loss of metals via the flue gas is controlled by regulating the temperature.

9. The process as claimed in claim 8, wherein the temperature control means comprises an auxiliary firing.

10. The process as claimed in claim 9, wherein the temperature measurement means further comprises an infrared camera to determine the local temperature in the waste within the rotary tube furnace.

11. The process as claimed in claim 10, wherein the infrared camera is located at the outlet end on a wall of an after-combustion chamber located at a distance from the outlet end of the rotary tube.

12. The process as claimed in claim 11, wherein the flue gas fed to the after-combustion chamber is firstly treated thermally at temperatures above 1000° C., dusts are precipitated in a downstream steam boiler and collected in a dust chamber, the flue gas is subsequently cooled to from 70 to 80° C. by spraying in water in a quench, fed to a first rotary scrubber operated under acidic conditions in which an acidic scrubbing liquid is fed in onto rotary disks, fed to a second rotary scrubber operated under alkaline conditions located downstream of the first rotary scrubber, after which any solid or liquid suspended materials still present are precipitated in an electrostatically operated condensation filter and the flue gas is passed to a catalytic after-purification and subsequently released as purified exhaust air via a chimney.

13. The process of claim 7, wherein comminuted iron parts, fluxes and/or solders are added to the waste.

\* \* \* \* \*